United States Patent
Swanson

(10) Patent No.: US 9,683,336 B2
(45) Date of Patent: Jun. 20, 2017

(54) APPARATUS AND METHOD FOR AN ASPHALT PLANT

(75) Inventor: Malcolm Swanson, Chickamauga, GA (US)

(73) Assignee: Astec, Inc., Chattanooga, TN (US)

(*) Notice: Subject to any disclaimer, the term of this patent is extended or adjusted under 35 U.S.C. 154(b) by 961 days.

(21) Appl. No.: 13/447,417

(22) Filed: Apr. 16, 2012

(65) Prior Publication Data

US 2012/0263007 A1 Oct. 18, 2012

Related U.S. Application Data

(60) Provisional application No. 61/517,129, filed on Apr. 14, 2011.

(51) Int. Cl.
*B28C 5/46* (2006.01)
*E01C 19/05* (2006.01)
*E01C 19/10* (2006.01)

(52) U.S. Cl.
CPC .......... *E01C 19/05* (2013.01); *E01C 19/1004* (2013.01); *E01C 19/1072* (2013.01)

(58) Field of Classification Search
CPC .......................... E01C 19/1004; E01C 19/1036
USPC ............................................................ 366/7
See application file for complete search history.

(56) References Cited

U.S. PATENT DOCUMENTS

| | | | | |
|---|---|---|---|---|
| 5,320,524 A * | 6/1994 | de Beus | ................. | B01D 45/10 432/103 |
| 5,334,012 A * | 8/1994 | Brock | ................. | E01C 19/1036 119/244 |
| 7,566,162 B1 * | 7/2009 | Swanson | ................. | C08L 95/00 366/15 |
| 7,758,235 B1 * | 7/2010 | Collette | ......................... | 366/7 |
| 2004/0179422 A1 * | 9/2004 | Hawkins | ............. | E01C 19/1036 366/7 |
| 2007/0041265 A1 * | 2/2007 | Dillman | ............. | E01C 19/1036 366/7 |
| 2008/0259714 A1 * | 10/2008 | Brock | ................. | E01C 19/1004 366/7 |
| 2008/0310249 A1 * | 12/2008 | Musil | ................. | E01C 19/1004 366/23 |

* cited by examiner

*Primary Examiner* — Tony G Soohoo
*Assistant Examiner* — Elizabeth Insler
(74) *Attorney, Agent, or Firm* — Chambliss, Bahner & Stophel, P.C.

(57) ABSTRACT

An asphalt plant adapted to use RAP to produce asphalt. The preferred asphalt plant comprises a bin that is adapted to store the RAP, a heat source that is adapted to supply heat, a dryer that is adapted to dry the RAP, a mixer that is adapted the mix the RAP and a means for conveying the RAP from the bin to the dryer. The preferred asphalt plant uses substantially only the RAP to produce asphalt. A method for producing asphalt from RAP comprising providing an asphalt plant adapted to use the RAP to produce asphalt. The preferred method further comprises conveying the RAP from the bin to the dryer, drying the RAP, and mixing the RAP.

15 Claims, 2 Drawing Sheets

APPARATUS AND METHOD FOR AN ASPHALT PLANT

CROSS-REFERENCES TO RELATED APPLICATIONS/PATENTS

This application relates back to and claims the benefit of priority from U.S. Provisional Application for Patent No. 61/517,129 entitled "Apparatus and Method for an Asphalt Plant" and filed on Apr. 14, 2011.

FIELD OF THE INVENTION

The present invention relates generally to asphalt plants, and particularly to asphalt plants adapted to produce asphalt from recycled asphalt product ("RAP").

BACKGROUND AND DESCRIPTION OF THE PRIOR ART

It is known to produce asphalt at an asphalt plant using a high percentage of recycled asphalt product (RAP). Conventional RAP asphalt plants, however, suffer from one or more disadvantages. For example, conventional RAP asphalt plants are not adapted to produce asphalt using recycled asphalt product without also producing undesirable emissions such as smoke, odors and volatile organic compounds ("VOCs"). Conventional RAP asphalt plants also use burners which directly expose the asphalt mix to a flame and results in undesirable oxidation of the asphalt mix. Conventional RAP asphalt plants further require an undesirable amount of maintenance and repair. Conventional RAP asphalt plants still further require excessive amounts of fuel to produce asphalt. In addition, there is an undesirable risk of baghouse contamination and fires in conventional RAP asphalt plants. Conventional asphalt plants also are not adapted to produce conventional hot mix asphalt or warm mix asphalt from either approximately 100% RAP or 100% virgin material or any combination thereof.

It would be desirable, therefore, if an apparatus and method for an asphalt plant could be provided that would reduce undesirable emissions such as smoke, odors and volatile organic compounds. It would also be desirable if such an apparatus and method could be provided that would reduce the oxidation of the asphalt mix. It would be further desirable if such an apparatus and method could be provided that would require less maintenance and fewer repairs. It would be still further desirable if such an apparatus and method could be provided that would increase the fuel efficiency of the plant. In addition, it would be desirable if such an apparatus and method could be provided that would reduce the risk of baghouse contamination and fires. It would also be desirable if such an apparatus and method could be provided that would produce conventional hot mix asphalt or warm mix asphalt from either approximately 100% RAP or 100% virgin material or any combination thereof.

ADVANTAGES OF THE PREFERRED EMBODIMENTS OF THE INVENTION

Accordingly, it is an advantage of the preferred embodiments of the invention claimed herein to provide an asphalt plant that reduces undesirable emissions such as smoke, odors and volatile organic compounds. It is also an advantage of the preferred embodiments of the invention claimed herein to provide an asphalt plant that reduces the oxidation of the asphalt mix. It is another advantage of the preferred embodiments of the invention claimed herein to provide an asphalt plant that requires less maintenance and fewer repairs. It is a further advantage of the preferred embodiments of the invention claimed herein to provide an asphalt plant that increases the fuel efficiency of the plant. In addition, it is an advantage of the preferred embodiments of the invention claimed herein to provide an asphalt plant that reduces the risk of baghouse contamination and fires. It is also an advantage of the preferred embodiments of the present invention to produce conventional hot mix asphalt or warm mix asphalt from either approximately 100% RAP or 100% virgin material or any combination thereof.

Additional advantages of the preferred embodiments of the invention will become apparent from an examination of the drawings and the ensuing description.

EXPLANATION OF TECHNICAL TERMS

As used herein, the term "bin" means any suitable means for storing RAP such as conventional storage bins, silos, tanks, containers, receptacles, carts, dumpsters, compartments and stockpiles.

As used herein, the term "RAP" means any form of reprocessed, reclaimed, rotomilled or recycled asphalt product or materials, including but not limited to aggregates and asphalt cement.

SUMMARY OF THE INVENTION

The invention comprises an asphalt plant adapted to use. RAP to produce asphalt. The preferred asphalt plant comprises a bin that is adapted to store the RAP, a heat source that is adapted to supply heat, a dryer that is adapted to dry the RAP, a mixer that is adapted the mix the RAP and a means for conveying the RAP from the bin to the dryer. The preferred asphalt plant uses substantially only the RAP to produce asphalt.

The present invention also comprises a method for producing asphalt from RAP. The preferred method comprises providing an asphalt plant adapted to use the RAP to produce asphalt. The preferred asphalt plant comprises a bin that is adapted to store the RAP, a heat source that is adapted to supply heat, a dryer that is adapted to dry the RAP, a mixer that is adapted the mix the RAP and a means for conveying the RAP from the bin to the dryer. The preferred asphalt plant uses substantially only the RAP to produce asphalt. The preferred method further comprises conveying the RAP from the bin to the dryer, drying the RAP, and mixing the RAP.

BRIEF DESCRIPTION OF THE DRAWINGS

The presently preferred embodiments of the invention are illustrated in the accompanying drawings, in which like reference numerals represent like parts throughout, and in which.

DESCRIPTION OF THE PREFERRED EMBODIMENTS OF THE INVENTION

Figure 1:
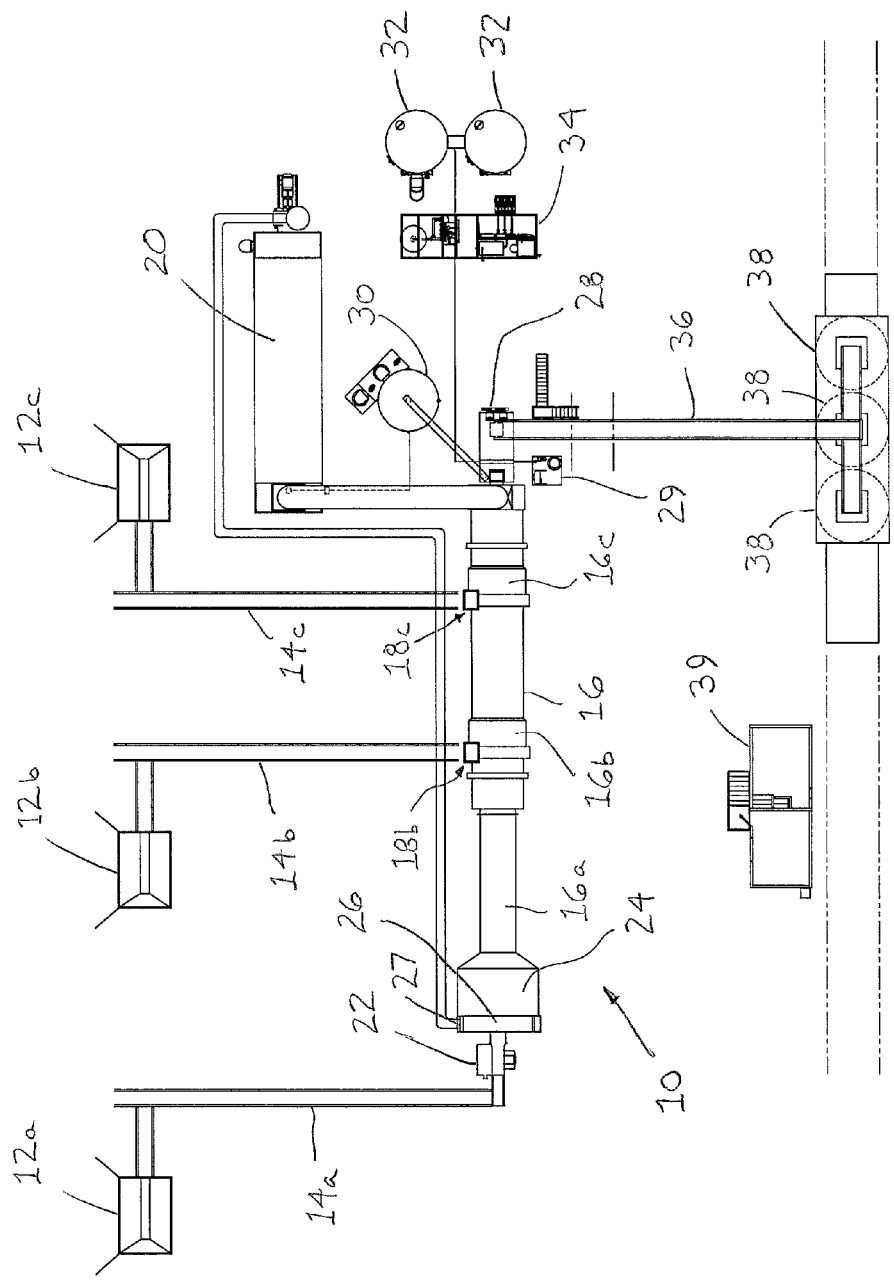
FIG. 1 is a top view of the preferred embodiment of the asphalt plant in accordance with the present invention.
Figure 2:
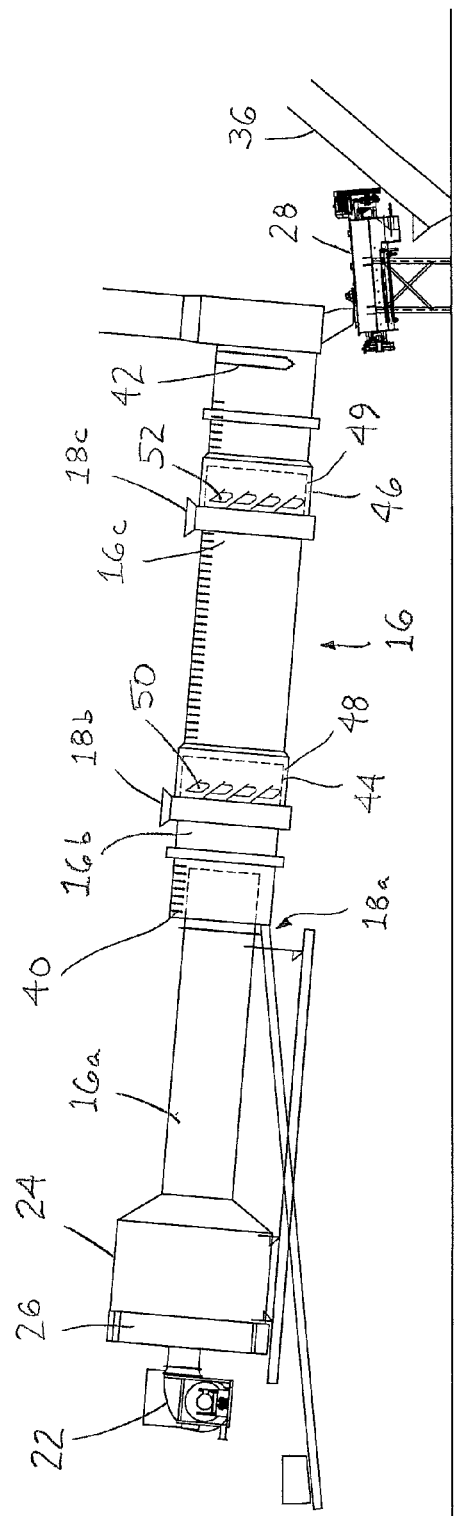
FIG. 2 is a partial sectional front view of the preferred embodiment of the asphalt plant illustrated in FIG. 1.

Referring now to the drawings, the preferred embodiments of the asphalt plant in accordance with the present invention are illustrated by FIGS. 1 through 2. As shown in FIGS. 1 through 2, the preferred embodiments of the asphalt plant in accordance with the present invention are adapted to use RAP to produce asphalt and reduce undesirable emissions such as smoke, odors and volatile organic compounds ("VOCs"). The preferred embodiments of the asphalt plant are also adapted to reduce the oxidation of the asphalt mix. The preferred embodiments of the asphalt plant are further adapted to require less maintenance and fewer repairs. The preferred embodiments of the asphalt plant are still further adapted to reduce fuel consumption and increase the fuel efficiency of the plant. In addition, the preferred embodiments of the asphalt plant are adapted to reduce the risk of baghouse contamination and'fires. The preferred embodiments of the asphalt plant are also adapted to produce conventional hot mix asphalt or warm mix asphalt from either approximately 100% RAP or 100% virgin material or any combination thereof.

Referring now to FIG. 1, a top view of the preferred asphalt plant in accordance with the present invention is illustrated. The preferred asphalt plant is designated generally by reference numeral 10. Preferred asphalt plant 10 is adapted to produce an asphalt mix comprising approximately 100% recycled asphalt product ("RAP"). As shown in FIG. 1, preferred asphalt plant 10 includes a bin adapted to store RAP. More particularly, preferred asphalt plant 10 includes plurality of RAP bins, i.e. coarse RAP bin 12a, medium RAP bin 12b, and fine RAP bin 12c for storing and releasing RAP. Preferably, bin 12a stores and releases coarse RAP, bin 12b stores and conveys medium RAP, and bin 12c stores and conveys fine RAP. Coarse RAP preferably comprises RAP that is larger than approximately ⅝ of an inch, medium RAP preferably comprises RAP that is between approximately ⅝ of an inch and approximately ¼ of an inch, and fine RAP preferably comprises RAP that is smaller than approximately ¼ of an inch. While RAP bins 12a, 12b and 12c are the preferred means for storing and releasing RAP, it is contemplated within the scope of the invention that other suitable devices, mechanisms, assemblies and/or combinations thereof may be used to store and release RAP. It is also contemplated within the scope of the invention that RAP may be stored and removed from stockpiles. It is further contemplated within the scope of the invention that coarse RAP, medium RAP and fine RAP may be of any suitable size.

Still referring to FIG. 1, preferred asphalt plant 10 also comprises a means for conveying RAP to a dryer from RAP bins 12a, 12b and 12c such as a conveyor. Preferably, asphalt plant 10 includes three incline conveyors, i.e. coarse RAP conveyor 14a, medium RAP conveyor 14b and fine RAP conveyor 14c, for conveying RAP from bins 12a, 12b and 12c, respectively, to a dryer. Incline conveyors 14a, 14b and 14c may be provided with a scalping screen. While incline conveyors 14a, 14b and 14c are the preferred means for conveying RAP from bins 12a, 12b and 12c, respectively, it is contemplated within the scope of the invention that any suitable device, mechanism, assembly or combination thereof may be used to convey the RAP. It is also contemplated that any suitable devices, mechanisms, assemblies and/or combinations thereof may be used to convey RAP from the bins, stockpiles or other means for storing and releasing the RAP to a dryer.

Still referring to FIG. 1, preferred asphalt plant 10 also includes a dryer such as parallel flow, direct fired, convective dryer 16 for drying and heating RAP. The preferred dryer 16 is a parallel flow rotating drum arrangement. Preferably, coarse RAP is conveyed from bin 12a by conveyor 14a to coarse RAP inlet 18a (see FIG. 2), medium RAP is conveyed from bin 12b by conveyor 14b to medium RAP inlet 18b, and fine RAP is conveyed from bin 12c by conveyor 14c to fine RAP inlet 18c. Preferred coarse RAP inlet 18a is in fluid communication with first dryer chamber 16a, preferred medium RAP inlet 18b is in fluid communication with second dryer chamber 16b and preferred fine RAP inlet 18c is in fluid communication with third dryer chamber 16c. See also FIG. 2. Preferred medium RAP inlet 18b is spaced apart from coarse RAP inlet 18a, and fine RAP inlet 18c is spaced apart from coarse RAP 18a inlet and medium RAP inlet 18b. Emissions from dryer 16 are preferably conveyed to baghouse 20 which is in fluid communication with the dryer. While dryer 16 is the preferred dryer, any suitable device, mechanism, assembly or combination thereof may be used to dry the RAP. Further, while FIG. 1 illustrates the preferred arrangement of inlets 18a, 18b and 18c, it is contemplated within the scope of the invention that the inlets may be disposed at any suitable location.

Still referring to FIG. 1, the preferred asphalt plant 10 includes, a heat source adapted to supply heat to dryer 16 such as burner assembly 22 and air heater 24. The preferred asphalt plant 10 also includes a combustion chamber such as extended length refractory combustion chamber 26 having recirculation duct 27. A portion of the smoke, VOCs and/or emissions produced in drying and heating the RAP may be scavenged from dryer 16 to combustion chamber 26 and consumed there. More particularly, smoke, VOCs and emissions are preferably destroyed by the flame of burner assembly 22. Also, because the atmosphere in preferred dryer 16 is largely steam produced by water evaporated from the RAP, oxygen is displaced further reducing smoke, VOC production, and oxidation of the asphalt cement portion of the RAP. For start up purposes, a water spray may be injected into the preferred dryer 16 to produce a steam atmosphere before introducing the first RAP. While burner assembly 22 and air heater 24 are the preferred heat sources, it is contemplated within the scope of the invention that any suitable heat source may be used to supply heat to the dryer.

Still referring to FIG. 1, preferred asphalt plant 10 further includes a mixer adapted to mix RAP such as a mixing drum or pugmill 28. Preferred pugmill 28 is in fluid communication with a water source such as water injector 29, a particulate source such as dust silo 30 and an asphalt cement source such as asphalt cement tanks 32. Preferred pugmill 28 is adapted to mix the RAP with a small amount of foamed virgin liquid asphalt cement. The liquid asphalt cement is preferably introduced as foam produced by water injector 29 to produce a 100% RAP warm mix. Indeed, the preferred asphalt plant 10 uses substantially only RAP to produce asphalt. It is contemplated, however, that warm mix technologies other than water produced foam may also be used. Preferably, the amount of foamed virgin liquid asphalt cement is less than approximately one percent (1%) of the RAP mix by weight. Because the preferred mix is nearly one hundred percent (100%) RAP and the RAP may be heated to temperatures lower than the evaporation temperature of liquid asphalt cement, emissions are further reduced. More particularly, the RAP mixture may be heated to temperatures in the range of approximately 220 degrees F. to approximately 280 degrees F. The evaporation temperature of the light ends of liquid asphalt cement is approximately 285 degrees F. In addition to reducing emissions, the preferred process also reduces fuel consumption and improves fuel efficiency. While the preferred amount of liquid asphalt cement is less than approximately 1% of the RAP mix by weight, it is contemplated within the scope of the invention that the amount of liquid asphalt cement may be equal to or greater than 1%. Further, while pugmill 28 is the preferred means for mixing RAP, it is contemplated within the scope of the invention that any suitable device, mechanism, assembly or combination thereof may be used to mix the RAP.

Still referring to FIG. 1, preferred asphalt plant 10 includes dust silo 30, asphalt cement tanks 32 and hot oil heater 34. Preferred dust silo 30 is adapted to convey flyash, lime or other dust material to pugmill 28 for the purpose of coating the bags in the baghouse, particles of sticky, warm asphalt cement droplets and RAP in order to prevent the RAP from sticking to the plant equipment. Preferred asphalt cement tanks 32 are adapted to store and convey asphalt cement to pugmill 28. Preferred hot oil heater 34 is adapted to heat asphalt cement and machine elements that asphalt cement will contact. Emissions from hot oil heater 34 may be conveyed to baghouse 20.

Still referring to FIG. 1, after the RAP and liquid asphalt cement are mixed in pugmill 28, the mixture of the coarse RAP, medium RAP and fine RAP is preferably conveyed from the mixer by a mixed RAP conveyor such as drag conveyor 36 to a storage means such as mix storage silos 38. It is also contemplated within the scope of the invention that the RAP may be conveyed from the mixer to a truck scale. While drag conveyor 36 is the preferred means for conveying the mixed RAP from pugmill 28, it is contemplated that any suitable device, mechanism, assembly or combination thereof may be used to convey the mixed RAP from the pugmill. Preferably, the operation of asphalt plant 10 is automatically and remotely controlled by a control system from control center 39.

Referring now to FIG. 2, a partial sectional front view of preferred asphalt plant 10 is illustrated. As shown in FIG. 2, preferred asphalt plant 10 includes dryer 16 which is adapted to receive RAP in different locations. Preferably, dryer 16 is adapted to receive coarse RAP near the location it also receives hot air from a heat source, medium-sized RAP at a location downstream from the location it receives coarse RAP and hot air, and fine RAP at a location downstream from the location it receives medium RAP. More particularly, in preferred first dryer chamber 16a of dryer 16, hot air and coarse RAP are introduced and the coarse RAP is heated to melt its asphalt cement and produce a sticky surface. Preferably, gas temperatures in first dryer chamber 16a are in the range of approximately 2000 degrees F. and approximately 2100 degrees F. (or possibly lower) and coarse RAP temperatures are approximately 160 degrees F. In the preferred second dryer chamber 16b of dryer 16, medium-sized RAP is introduced and mixed with the coarse RAP and airborne fines attach to the heated coarse RAP. Preferably, gas temperatures in second dryer chamber 16b are in the range of approximately 1900 degrees F. and approximately 2000 degrees F. (or possibly lower) and the RAP temperatures are approximately 250 degrees. In the preferred third dryer chamber 16c of dryer 16, fine RAP is introduced and all the RAP materials are blended, airborne fines attach to heated to RAP, and heating is completed. Preferably, gas temperatures in third dryer chamber 16c are in the range of approximately 280 degrees F. and approximately 1000 degrees F. (or possibly lower) and the RAP temperatures, are in the range of approximately 220 degrees F. and approximately 280 degrees F. As a result of the foregoing, the coldest and wettest materials are exposed to the hottest gases and the most radiation, and some drying and heating can take place without reaching temperatures which produce smoke. The heat for the dryer is preferably produced by a heat source such as burner 22 and air heater 24.

Still referring to FIG. 2, each of the chambers of preferred dryer 16 includes a cleaning device such as kiln chains 40 which are adapted to slide on the drum surfaces to prevent RAP from adhering to the interior surface of the chamber by scrubbing away any buildup of RAP materials. The preferred kiln chains 40 are also adapted to transfer heat from the hot gas to the RAP. In addition, preferred third chamber 16c includes chain garland 42 which is adapted to capture fines. More particularly, airborne RAP fines present in the exhaust stream at the dryer discharge end may be collected and returned to the mix by garlands of chains draped like a curtain within the discharge end of the drum. As a result, the risk of baghouse contamination is reduced. In another preferred embodiment, a small amount of baghouse dust from a conventional, hot mix plant, flyash, lime or a similar material may be injected into the exhaust gas stream upstream of the baghouse for the purpose of coating the bags in the baghouse and RAP particles with fine dust in order to prevent RAP particles from sticking to the bags or other interior surfaces of the baghouse.

Still referring to FIG. 2, exhaust from the preferred dryer 16 is preferably conveyed to baghouse 20. The RAP mixture from dryer 16 is conveyed to a mixing device such as pugmill 28. While in pugmill 28, the RAP mixture is preferably mixed with water foamed asphalt cement. The combination is thereafter conveyed from pugmill 28 by drag conveyor 36.

Still referring to FIG. 2, the preferred second chamber 16b and the preferred third chamber 16c each include a cylindrical extension 44 and 46, respectively. The preferred cylindrical extensions 44 and 46 have a smaller diameter than the diameter of the adjacent exterior dryer wall so as to form annuli 48 and 49, respectively. In addition, the preferred cylindrical extensions 44 and 46 include apertures 50 and 52, respectively, through which RAP may pass from annuli 48 and 50, respectively, into the inner portion of chambers 16b and 16c, respectively. While the RAP material is in annuli 48 or 49, it is shielded from the heated gas flow in the inner portion of chambers 16b and 16c, respectively.

The invention also comprises a method for producing asphalt. The preferred method, comprising providing an asphalt plant as described herein. The preferred method further comprises conveying RAP from the bin to the dryer, drying the RAP and mixing the RAP. The preferred method still further comprises separating RAP into different sizes, introducing the different-sized RAP into different locations in the dryer, mixing the RAP with asphalt cement, conveying the RAP from the mixer and controlling the plant with a control system.

In operation, several advantages of the preferred embodiments of the asphalt plant in accordance with the present invention are achieved. For example, the preferred embodiments of the asphalt plant are adapted to reduce undesirable emissions such as smoke, odors and volatile organic compounds. The preferred embodiments of the asphalt plant are also adapted to reduce the oxidation of the asphalt mix. The preferred embodiments of the asphalt plant are further adapted to require less maintenance and fewer repairs. The preferred embodiments of the asphalt plant are still further adapted to reduce fuel consumption and increase the fuel efficiency of the plant. In addition, the preferred embodiments of the asphalt plant are adapted to reduce the risk of baghouse contamination and fires. The preferred embodiments of the asphalt plant are also adapted to produce conventional hot mix asphalt or warm mix asphalt from either approximately 100% RAP or 100% virgin material or any combination thereof.

Although this description contains many specifics, these should not be construed as limiting the scope of the invention but as merely providing illustrations of some of the presently preferred embodiments thereof, as well as the best mode contemplated by the inventors of carrying out the invention. The invention, as described herein, is susceptible to various modifications and adaptations, and the same are intended to be comprehended within the meaning and range of equivalents of the appended claims.

What is claimed is:

1. A method for producing asphalt from RAP, said method comprising:
    (a) providing an asphalt plant adapted to use the RAP to produce asphalt, said asphalt plant comprising:
        (1) a bin, said bin being adapted store the RAP;
        (2) a heat source, said heat source being adapted to supply heat;
        (3) a dryer, said dryer being adapted to dry the RAP;
        (4) a mixer; said mixer being adapted the mix the RAP received from the dryer;
        (5) a means for conveying the RAP from the bin to the dryer;
        (6) a dust silo, said dust silo being adapted to directly convey dust material to the mixer and to convey dust to coat the bags of the bag house;
        (7) a baghouse, said baghouse being in fluid communication with the dryer, mixer and dust silo, said baghouse having one or more bags;
    wherein the asphalt plant uses substantially only the RAP to produce asphalt; and
    wherein the mixer is adapted to coat the one or bags in the baghouse and the rap with the dust material conveyed from the dust silo;
    (b) conveying the RAP from the bin to the dryer;
    (c) drying the RAP in the dryer;
    (d) mixing the RAP in the mixer;
    (e) conveying dust from the dust silo directly in the mixer;
    (f) coating the RAP with the dust material conveyed from the dust silo;
    (g) conveying the dust from the dust silo to coat the bags in the baghouse via the mixer; and
    (h) coating one or more bags in the baghouse.

2. The method of claim 1 wherein the RAP is mixed with asphalt cement.

3. The method of claim 1 further comprising conveying the RAP from the mixer.

4. The method of claim 1 further comprising controlling the plant with a control system.

5. The method of claim 1 wherein the plant comprises a coarse RAP bin, a medium RAP bin and a fine RAP bin.

6. The method of claim 5 wherein the dryer comprises a coarse RAP inlet, a medium RAP inlet spaced apart from the coarse RAP inlet, and a fine RAP inlet spaced apart from the coarse RAP inlet and the medium RAP inlet.

7. The method of claim 6 further comprising segregating RAP into coarse RAP, medium RAP, and fine RAP.

8. The method of claim 7 further comprising storing the coarse RAP into the coarse RAP bin, storing the medium RAP into the medium RAP bin, and storing the fine RAP into the fine RAP bin.

9. The method of claim 8 further comprising conveying RAP from the coarse RAP bin to the coarse RAP inlet, conveying RAP from the medium RAP bin to the medium RAP inlet, and conveying RAP from the fine RAP bin to the fine RAP inlet.

10. The method of claim 1 wherein the dryer comprises a chain.

11. The method of claim 10 further comprising contacting the fine RAP with the chain.

12. The method of claim 1 wherein the means for conveying the RAP comprises a conveyor.

13. The method of claim 1 wherein the heat source comprises a burner assembly.

14. The method of claim 1 wherein the mixer is in fluid communication with a water injector.

15. The method of claim 1 wherein the mixer is in fluid communication with an asphalt cement source.

* * * * *

UNITED STATES PATENT AND TRADEMARK OFFICE
CERTIFICATE OF CORRECTION

| | | |
|---|---|---|
| PATENT NO. | : 9,683,336 B2 | Page 1 of 1 |
| APPLICATION NO. | : 13/447417 | |
| DATED | : June 20, 2017 | |
| INVENTOR(S) | : Malcolm Swanson | |

It is certified that error appears in the above-identified patent and that said Letters Patent is hereby corrected as shown below:

In the Claims

Claim 1, Line 5, change: "(1) a bin, said bin being adapted store the RAP;" to --(1) a bin, said bin being adapted to store the RAP;--

Claim 1, Line 9, change: "(4) a mixer; said mixer being adapted the mix the RAP" to --(4) a mixer; said mixer being adapted to mix the RAP--

Claim 1, Line 21, change: "wherein the mixer is adapted to coat the one or bags in the" to --wherein the mixer is adapted to coat the one or more bags in the--

Claim 1, Line 22, change: "baghouse and the rap with the dust material conveyed" to --baghouse and the RAP with the dust material conveyed--

Signed and Sealed this
Eighth Day of August, 2017

Joseph Matal
*Performing the Functions and Duties of the
Under Secretary of Commerce for Intellectual Property and
Director of the United States Patent and Trademark Office*